United States Patent
Szigeti et al.

(10) Patent No.: US 12,225,057 B2
(45) Date of Patent: *Feb. 11, 2025

(54) RESOLVING ACCESS POLICIES BETWEEN INTENT-BASED NETWORK ARCHITECTURES AND CLOUD NATIVE ARCHITECTURES

(71) Applicant: Cisco Technology, Inc., San Jose, CA (US)

(72) Inventors: Thomas Szigeti, Vancouver (CA); David John Zacks, Vancouver (CA); Walter Hulick, Pearland, TX (US); Shannon McFarland, Parker, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,048

(22) Filed: Sep. 8, 2023

(65) Prior Publication Data
US 2023/0421610 A1    Dec. 28, 2023

Related U.S. Application Data

(63) Continuation of application No. 17/473,306, filed on Sep. 13, 2021, now Pat. No. 11,792,230.

(51) Int. Cl.
G06F 21/62    (2013.01)
G06F 21/71    (2013.01)
(Continued)

(52) U.S. Cl.
CPC .......... *H04L 63/20* (2013.01); *H04L 63/0876* (2013.01); *H04L 63/101* (2013.01)

(58) Field of Classification Search
None
See application file for complete search history.

(56) References Cited

U.S. PATENT DOCUMENTS

| 10,944,691 B1 | 3/2021 | Raut et al. |
| 10,944,793 B2 | 3/2021 | Nimmagadda et al. |
| (Continued) | | |

OTHER PUBLICATIONS

Intent-Based End-to-End Network Service Orchestration System for Multi-Platforms. Rafiq. MDPI. (Year: 2020).*

(Continued)

*Primary Examiner* — Venkat Perungavoor
(74) *Attorney, Agent, or Firm* — Lee & Hayes, P.C.

(57) ABSTRACT

Techniques for expressing, communicating, de-conflicting, and enforcing consistent access policies between an IBN architecture and a Cloud-Native architecture. Generally, network administrators and/or users of a Cloud-Native architecture and an IBN architecture express access policies independently for the two different domains or architectures. According to the techniques described herein, a Network Service Endpoint (NSE) of the Cloud-Native architecture may exchange access policies with a network device of the IBN architecture. After exchanging access policies, conflicts between the sets of access policies may be identified, such as differences between allowing or denying communications between microservices and/or applications. The conflicts may be de-conflicted using various types of heuristics or rules, such as always selecting an access policy of the IBN architecture when conflicts arise. After the access policies have been de-conflicted, the IBN architecture and Cloud-Native architecture may then apply consistent access policies for traffic and communications in their respective network architectures.

20 Claims, 10 Drawing Sheets

(51) Int. Cl.
  *H04L 9/40*    (2022.01)
  *G06F 21/78*    (2013.01)

(56) References Cited

U.S. PATENT DOCUMENTS

| | | |
|---|---|---|
| 2018/0375802 A1 | 12/2018 | Wackerly et al. |
| 2020/0059370 A1 | 2/2020 | Abraham |
| 2020/0322273 A1 | 10/2020 | Natal et al. |
| 2022/0200863 A1 | 6/2022 | Kotalwar |
| 2023/0081708 A1 | 3/2023 | Szigeti |

OTHER PUBLICATIONS

Software defined wireless sensor networks application opportunities for efficient network management: A survey. Modieginyane. Elsevier. (Year: 2018).*

Energy-efficient auto-scaling of virtualized network function instances based on resource execution pattern> Mehmood. Elsevier. (Year: 2020).*

Abhashkumar, et al., "Supporting Diverse Dynamic Intent-based Policies using Janus", ACM, Dec. 2017, pp. 296-309.

"Driving Intent-Based Networking with AppFormix", Juniper Networks, Jun. 1, 2021, 4 pages.

Rafiq, et al, "Intent-Based Slicing between Containers in SDN Overlay Network", ResearchGate, Journal of Communications vol. 15, No. 3, Mar. 2020, 9 pages.

Zhang, et al., "Demo Abstract: An Intent Solver for Enabling Intent-based SDN", IEEE, 2017, pp. 968-969.

\* cited by examiner

400 ⤵

```
┌─────────────────────────────────────────────────────────────────────┐
│ OBTAIN A FIRST SET OF ACCESS POLICIES FOR A NETWORK SERVICE MESH,   │
│ THE FIRST SET OF ACCESS POLICIES DEFINING WHETHER FIRST             │
│ APPLICATIONS ARE ALLOWED OR RESTRICTED FROM COMMUNICATING IN THE    │
│ NETWORK SERVICE MESH WITH SECOND APPLICATIONS                       │
│ 402                                                                 │
└─────────────────────────────────────────────────────────────────────┘
                                   │
                                   ▼
┌─────────────────────────────────────────────────────────────────────┐
│ OBTAIN A SECOND SET OF ACCESS POLICIES FOR AN INTENT-BASED NETWORK  │
│ (IBN) ARCHITECTURE, THE SECOND SET OF ACCESS POLICIES DEFINING      │
│ WHETHER THE FIRST APPLICATIONS ARE ALLOWED OR RESTRICTED FROM       │
│ COMMUNICATING IN THE IBN ARCHITECTURE WITH THE SECOND APPLICATIONS  │
│ 404                                                                 │
└─────────────────────────────────────────────────────────────────────┘
                                   │
                                   ▼
┌─────────────────────────────────────────────────────────────────────┐
│ IDENTIFY A CONFLICT BETWEEN THE FIRST SET OF ACCESS POLICIES AND    │
│ THE SECOND SET OF ACCESS POLICIES                                   │
│ 406                                                                 │
└─────────────────────────────────────────────────────────────────────┘
                                   │
                                   ▼
┌─────────────────────────────────────────────────────────────────────┐
│ DETERMINE A RESOLUTION FOR THE CONFLICT BETWEEN THE FIRST SET OF    │
│ ACCESS POLICIES AND THE SECOND SET OF ACCESS POLICIES               │
│ 408                                                                 │
└─────────────────────────────────────────────────────────────────────┘
                                   │
                                   ▼
┌─────────────────────────────────────────────────────────────────────┐
│ DETERMINE, BASED AT LEAST IN PART ON THE RESOLUTION, A THIRD SET OF │
│ ACCESS POLICIES THAT DEFINES WHETHER THE FIRST APPLICATIONS ARE     │
│ ALLOWED OR RESTRICTED FROM COMMUNICATING WITH THE SECOND            │
│ APPLICATIONS IN THE NETWORK SERVICE MESH AND THE IBN ARCHITECTURE.  │
│ 410                                                                 │
└─────────────────────────────────────────────────────────────────────┘
```

FIG. 4

RESOLVING ACCESS POLICIES BETWEEN INTENT-BASED NETWORK ARCHITECTURES AND CLOUD NATIVE ARCHITECTURES

CROSS REFERENCE TO RELATED APPLICATIONS

This application is a continuation of and claims priority to U.S. patent application Ser. No. 17/473,306, filed Sep. 13, 2021, the entire contents of which are incorporated herein by reference.

TECHNICAL FIELD

The present disclosure relates generally to techniques for determining and enforcing consistent access policies between Intent-Based Network (IBN) architectures and Cloud Native Architectures.

BACKGROUND

Computer networks include groups of computing devices that are interconnected such that the devices are able to communicate with each other using communication protocols over the interconnections. However, it is often desirable to prevent certain devices from communicating with other devices in these networks, such as for computer security and segmentation. Traditionally, access-control lists (ACLs) have been used to prevent or allow devices from communicating with other devices where the ACLs are generally lists of permissions associated with different devices. The ACLs specify what devices, users, and/or system processes are granted access to devices or data in the computer networks. However, as computer networks become larger and more complex, these ACLs also increase in size to be thousands of lines long and collectively amount to potentially millions of entries across the networks.

To help improve the scalability, flexibility, and manageability of such access policies, security policies for computer networks are continuing to be implemented using declarative IBN architectures. Generally, IBN architectures build on software-defined networking (SDN) where a network controller acts as a central control point and captures business intent and translates it into policies that can be automated an applied consistently across the network. Network administrators are able to use IBN to define their intent for network operations using a declarative model, and controllers translate that intent into policies, activate the policies across the physical and virtual network infrastructure, and verify that the desired intent has been applied to the network infrastructure.

Intent-based Networking has emerged in mange different networking areas, such as Software Defined Access (SDA), Software-Defined Wide-Area Networks (SD-WANs), Applicant-Centric Infrastructure (ACI), and so forth. However, various difficulties arise when attempting to integrate access policies into new and emerging network infrastructures.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for obtaining access policies for an IBN architecture and a Cloud-Native architecture, de-conflicting the access policies, and enforce consistent access policies across each architecture.

DESCRIPTION OF EXAMPLE EMBODIMENTS

Overview

Figure 1:
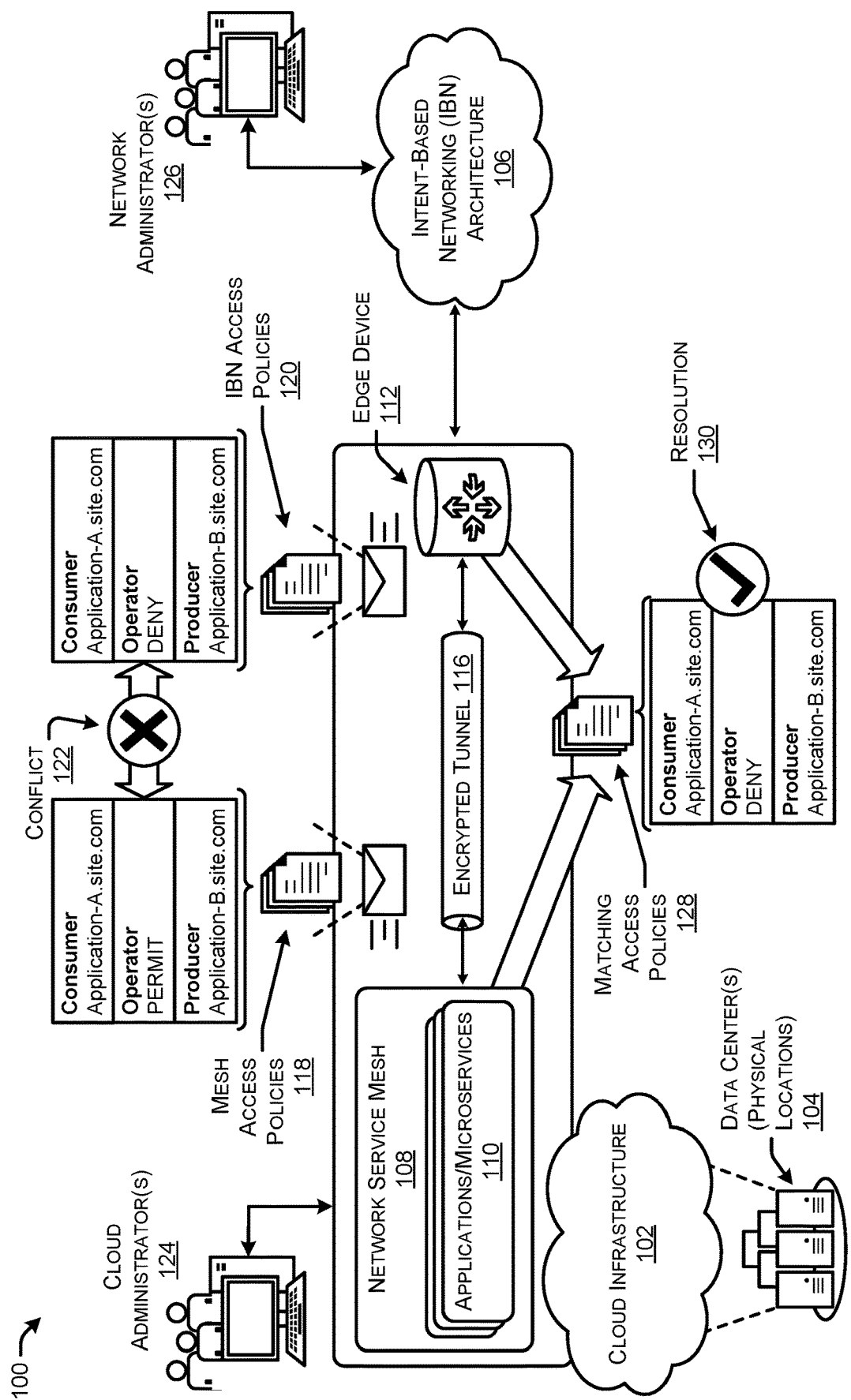
FIG. 1 illustrates a system-architecture diagram of an example environment in which an IBN architecture and a Cloud-Native architecture exchange, de-conflict, and enforce consistent access policies.

This disclosure describes techniques for expressing, communicating, de-conflicting, and enforcing consistent access policies between an IBN architecture and a Cloud-Native architecture.

The techniques may include a first method that includes obtaining a first set of access policies for a network service mesh, and obtaining a second set of access policies for an intent-based network (IBN) architecture. Generally, the first set of access policies defines whether first applications are allowed or restricted from communicating in the network service mesh with second applications, and the second set of access policies defines whether the first applications are allowed or restricted from communicating in the IBN architecture with the second applications. Additionally, the first method may include identifying a conflict between the first set of access policies and the second set of access policies, and determining a resolution for the conflict between the first set of access policies and the second set of access policies. Additionally, the first method may include determining, based at least in part on the resolution, a third set of access policies that defines whether the first applications are allowed or restricted from communicating with the second applications in the network service mesh and the IBN architecture.

The techniques described herein may additionally include a second method that comprises receiving, at a network service mesh, a first set of access policies, and receiving and from an intent-based network (IBN) architecture, a second set of access policies. Generally, the first set of access policies define whether first applications are allowed or restricted from communicating in the network service mesh with second applications, and the second set of access policies define whether the first applications are allowed or restricted from communicating in the IBN architecture with the second applications. Additionally, the second method may include identifying a conflict between the first set of access policies and the second set of access policies, and obtaining data indicating a resolution for the conflict between the first set of access policies and the second set of access policies. Further, the second method may include determining, based at least in part on the resolution, a third set of access policies that defines whether the first applications are allowed or restricted from communicating with the second applications in the network service mesh and the IBN architecture, and applying the third set of access policies to communications in the network service mesh.

Additionally, the techniques described in this disclosure may be performed as a method and/or by a system having non-transitory computer-readable media storing computer-executable instructions that, when executed by one or more processors, performs the techniques described above.

Example Embodiments

Computing networks are generally secured using access-controls lists (ACLs) to define what devices are allowed to, or prevented from, with communicating with other devices or services in the networks. However, as computing networks continue to grow in size and complexity, ACLs are expressed as thousands of lines per network device and can amount to millions of entries across the networks. To help improve the scalability, flexibility, and manageability of such access policies, security policies for computer networks are continuing to be implemented using declarative IBN architectures. While IBN architectures are being applied to different types of networks, none of the existing IBN architectures apply to Cloud-Native architectures.

Generally, Cloud-Native architectures are systems that are built to exist and run in the cloud. Cloud-Native architectures utilize cloud services to allow dynamic and agile application development techniques that take a modular approach to building, running, and updating software through cloud-based microservices, as opposed to monolithic application infrastructures. Cloud-Native applications are built or implemented using microservices that are run using containers and orchestrated using container-orchestration systems (e.g., Kubernetes). However, Cloud-Native applications that are built and orchestrated with container-orchestration systems have network access that is, by default, any-to-any and unencrypted. To improve upon the default security posture of such Cloud-Native architectures, network administrators often deploy service meshes (e.g., Istio, Linkerd, etc.) that allow for segmentation and/or micro-segmentation within container clusters. Additionally, these service meshes provide encryption for Cloud-Native architectures, such as via Mutual Transport Layer Security (mTLS) for intra-cluster microservice communications (as well as providing many other benefits relating to observability, traffic management, blue/green or canary or phased rollout application deployment options, circuit breaking, etc.).

However, even with service meshes, the access and security policies that are deployed within the Cloud-Native architectures (e.g., within the clusters) are independent and orthogonal to security policies across the rest of the IBN architecture. As such, administrators need to manage two sets of security policies independently, one for the IBN and another for their Cloud Native environments. However, this conflicts with the overall goal of Intent-Based Networking which is to declare business-level intent once, and have all the different domains (e.g., network, security, application, etc.) deliver the expressed intent. Currently, this is not being achieved because, as noted above, security policies and access policies for Cloud-Native architectures are required to be managed independent from the access policies of the IBN architectures (e.g., SD-WAN, SDA, etc.).

This disclosure describes techniques for expressing, communicating, de-conflicting, and enforcing consistent access policies between an IBN architecture and a Cloud-Native architecture. In an illustrative example, the techniques enable intent-based policies to be shared across SD-WAN and Cloud-Native clusters as these domains are generally adjacent each other. Generally, network administrators and/or users of a Cloud-Native architecture and an IBN architecture express access policies independently for the two different domains or architectures. In some instances, the access policies may be expressed in different languages or semantics. According to the techniques described herein, a Network Service Endpoint (NSE) of the Cloud-Native architecture may exchange access policies with a network device of the IBN architecture (e.g., edge device such as a router). After the access policies have been exchanged, conflicts between the sets of access policies may be identified, such as differences between allowing or denying communications between microservices and/or applications. In different examples, the conflicts may be de-conflicted using various types of heuristics or rules, such as always selecting an access policy of the IBN architecture when conflicts arise. After the access policies have been de-conflicted and reconciled, the IBN architecture and Cloud-Native architecture may then apply consistent access policies for traffic and communications in their respective network architectures.

Certain implementations and embodiments of the disclosure will now be described more fully below with reference to the accompanying figures, in which various aspects are shown. However, the various aspects may be implemented in many different forms and should not be construed as limited to the implementations set forth herein. Like numbers refer to like elements throughout.

FIG. 1 illustrates a system-architecture diagram of an example environment 100 in which an IBN architecture and a Cloud-Native architecture exchange, de-conflict, and enforce consistent access policies.

As illustrated, a cloud infrastructure 102 may include or be supported by devices that are housed or located in one or more data centers 104 that may be located at different physical locations. For instance, the cloud infrastructure 102 may be supported by networks of devices in a public cloud computing platform, a private/enterprise computing platform, and/or any combination thereof. The one or more data centers 104 may be physical facilities or buildings located across geographic areas that are designated to store networked devices that are part of the cloud infrastructure 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the cloud infrastructure 102 may not be located in explicitly defined data centers 104 and, rather, may be located in other locations or buildings.

The cloud infrastructure 102 may be accessible to, or communicatively coupled to, an Intent-Based Networking (IBN) architecture 106. The IBN architecture 106 may generally be any type of networking architecture that can be expressed or managed using intent expressions. For instance, the IBN architecture may be a Software Defined Access (SDA) architecture, a Software-Defined Wide-Area Network (SD-WAN) architecture, an Applicant-Centric Infrastructure (ACI) architecture, and so forth. The IBN architecture 106 may build on software-defined networking (SDN) where a network controller acts as a central control point and captures business intent and translates it into policies that can be automated an applied consistently across the IBN architecture 106. Network administrators 126 are able to use IBN to define their intent for network operations of the IBN architecture 106 using a declarative model, and one or more controllers of the IBN architecture 106 translate that intent into policies, activate the policies across the physical and virtual network infrastructure, and verify that the desired intent has been applied to the IBN architecture 106. Thus, intent declarations may be used to generate and apply security and access policies for the IBN architecture 106.

Similarly, one or more cloud administrators 124 may define access policies using a network service mesh 108 for one or more applications and/or microservices 110 that are running in the cloud infrastructure 102. The cloud infrastructure 102 may provide services to run or host a Cloud-Native application. Generally, Cloud-Native applications are developed as coupled microservices that run inside containers that are managed by orchestration platforms, such as Kubernetes. The orchestration platform may provide deployment, scaling, and management of containerized applications, and the applications/microservices 110 may be deployed in clusters and based on microservices architecture. In such examples, there is generally larger amounts of east-west traffic among the services 110, and the orchestration platform may utilize a flat layer 3 network model to address the network needs of these east-west traffics where each pod is assigned a unique IP address, and each pod can communicate directly with any other pod in the same cluster without NAT (Network Address Translation). However, the orchestration platform that implemented the Cloud-Native application may have limitations, and thus, a network service mesh 108 may be used for the applications/microservices 110.

Generally, the network service mesh 108 may provide advanced L2/L3 networking capabilities for applications 110 deployed using a containerized architecture that is managed by a container-orchestration platform. For instance, the network service mesh 108 may allow for segmentation and/or micro-segmentation within container clusters, as well as for encryption via Mutual Transport Layer Security (mTLS) for intra-cluster microservice communications (as well as providing many other benefits relating to observability, traffic management, blue/green or canary or phased rollout application deployment options, circuit breaking, etc.). Using a network service mesh 108, each node in the container clusters may have a respective network service endpoint (NSE) that allows the nodes (and pods running on a given node) to interconnect with network devices, such a an edge device 112 (e.g., router) provided that the network devices have implemented the necessary software development kit (SDK).

Accordingly, the network service mesh 108 may provide additional capabilities to the applications/microservices 110 that are implemented in a Cloud-Native architecture and using a containerized-orchestration platform (e.g., Kubernetes), such as segmentation and security via access policies. Thus, one or more cloud administrators 124 may be able to define and apply access policies for the applications/microservices to restrict or permit communications in the cloud infrastructure 102 using the network service mesh.

Thus, the access policies defined for the applications/microservices in the cloud infrastructure, 102 may be independent and orthogonal to security/access policies across the rest of the IBN architecture 106, Accordingly, the techniques described herein target expressing, communicating, de-conflicting, and enforcing consistent access policies between the IBN architecture 106 and a Cloud-Native architecture 102.

In some instances, a network service endpoint of the network service mesh 108 may establish one or more encrypted tunnels 116 with an edge device 112 associated with the IBN architecture 106. The edge device 112 may be any type of networking device, such as a router, a switch, a gateway, and so forth. The encrypted tunnel 116 may be any type of encrypted tunnel, such as Virtual Extensible Local Area Network (VXLAN), Network Virtualization Generic Routing Encapsulation (NVGRE), Overlay Transport Virtualizations (OTV), Internet Protocol Security (IPsec), and so forth. In a specific example, each NSE may establish a respective VLXLAN tunnel to an SD-WAN router (e.g., edge device 112) hosted in the same cloud infrastructure 102 managed by a cloud provider (these can be IPSec-only; but optionally VXLAN may encapsulate IPSec, to ensure confidentiality). The VXLAN header may include fields for a Virtual Network Identifier (VNID) and a Scalable Group Tag (SGT). Using this encapsulation method, along with these logical identifiers, preserves and enforces the logical separation of traffic all the way to/from the container cluster. To note, the method to achieve VXLAN encapsulation is that the NSE programs the Vector Packet Processing (VPP) fast network data plane in the Kubernetes cluster to perform the VXLAN encapsulation, as illustrated below:

App_Container→nsm0_intf→VPP→NSF→VPP (VXLAN)→SD-WAN_vEdge_SDK_interface

After creating the encrypted tunnels 116, the NSEs may exchange mesh access policies 118 deployed over the network service mesh 108 with the edge device 112 for IBN access policies 120 associated with the IBN architecture (e.g., SD-WAN access policies). For instance, one or more of the NSEs may send mesh access policies 118 to the edge deice(s) 112, and one or more edge device(s) 112 may send IBN access policies 120 to the NSE(s) via encrypted tunnel(s) 116.

After exchanging policies, a device or system (e.g., orchestrator, controller, etc.) in the cloud infrastructure 102 and a device or system (e.g., orchestrator, controller, etc.) in the IBN architecture 106 may each compare or analyze the access policies 118 and 120 to identify conflicts or differences between the sets of access policies 118/120. Generally, a conflict is any access rule or policy that results in communications being treated differently in the cloud infrastructure 102 and IBN architecture, and/or an absence of an access rule or policy from one of the access policies 118/120. For instance, the mesh access policy 118 may permit particular applications or microservices 110 to communicate in the network service mesh 108, whereas the IBN access policy 120 may deny the same applications or microservices 110 from communicating in the IBN architecture 106. As another example, the IBN access policy 120 may indicate that particular applications or microservices 110 are either allowed or denied from communicating, and the mesh access policies 118 may be silent regarding and access policy for those same applications or microservices 110. In some instances, prior to comparing the mesh access policies 118 and IBN access policies, the two sets of access policies 118/120 may be converted or expressed in the same format or semantics. For instance, one or both of the sets of access policies 118/120 may be translated into a common format or expression.

After identifying the conflicts in the sets of access policies 118/120, the conflicts may be resolved using various techniques. In some examples, the conflicts may be reported to the cloud administrator(s) 124 and the network administrator(s) 126 that provide input to resolve the conflicts. For instance, the cloud administrator(s) 124 and the network administrator(s) 126 may be alerted to the conflicts, and may provide a resolution to the conflicts that bring the sets of access policies 18/120 into alignment of intent.

In another example, devices or systems in the cloud infrastructure 102 and IBN architecture 106 (e.g., orchestrators, controllers, etc.) may automatically resolve the conflicts according to different rules or heuristics. For example, the devices or systems may simply select the access policy defined in one of the cloud infrastructure 102 or IBN architecture 106 as always "winning" or being selected when a conflict arises. As another example, the cloud infrastructure 102 or IBN architecture 106 may be selected based on the type of access rule or policy. However, various types of rules may be used when de-conflicting the conflicts between the mesh access policies 118 and the IBN access policies 120.

Once the conflicts 122 are resolved, the access policies 118/120 deployed within the service mesh 108 and the IBN architecture 106 are set to match to result in matching access policies 128 with resolution(s) 130. An API into a system (such as Cisco Secure Cloud Native, also known as "Portshift") may be utilized to exchange the policy information between these two domains (specifically the intent based network and the service mesh). Within the IBN architecture 106, access policies allow or restrict access to given applications based on (i) individual users or (more commonly) user-groups, (ii) client endpoint devices (PC vs. tablet vs. smartphone, etc.), (iii) network access methods (e.g. VPN, wired ports, wireless SSID, etc.), network locations (office vs. home location, country, etc.), etc. Generally, scalable group tags (SGTs) are imposed to represent these factors (or combination of factors) and SG-ACLs are used to enforce the access policies. In a default container environment, services generally have any-to-any access to any other service within the cluster. The service mesh 108 enables discrete access policies to be applied to microsegment services 110. The mesh access policies 118 cannot be effectively applied to pod LP addresses, as these are dynamic and constantly changing. To overcome this limitation. Portshift technology supports adding tags to a discrete microservice pods for observability and policy purposes. When a pod is spun up, then the Portshift system immediately knows what is the access policy for the microservice within the container within the pod and can enforce these access policies via, the service mesh.

While access policies based on combinations of users, devices, locations, etc. are enforced within the IBN architecture 106, the only access policies that need enforcement within the cluster of the Cloud-Native application 102 are application-to-application and/or microservice-to-microservice access policies. Further, a common denominator for application identification across both the IBN architecture 106 and within the clusters or the Cloud-Native infrastructure 102 are DNS names. As such, tables can be constructed based on application and/or microservice DNS names to represent the application access policy in each respective domain, as illustrated further in FIG. 3. If a conflict is detected between the access policies 118/120, then these conflicts can be presented to the respective administrators 124/126 for de-conflicting. Options for policy deconfliction could be to allow for the IBN access policy 120 to override by default or for the service mesh access policies 118 to override by default. Whichever method is used, once policies are deconflicted between the domains, then these are consistently enforced in both domains, specifically via SGTs and SG-ACLs in the IBN architecture 106 and microservice tags and service mesh within the Cloud Native environment 102 (e.g., Kubernetes).

After determining and creating the matching access policies 128, the matching access policies 128 are applied. For instance, appropriate SG-ACLS are dynamically deployed to the NSEs to enforce consistent policies at the cluster-to-IBN boundary in the cluster of the Cloud-Native infrastructure 102, and application-to-application access policies are expressed via tags (e.g., Portshift tags) and enforced via the service mesh 108. The matching access policies 128 are then applied to traffic. For instance, as microservice communications traverse from the NSEs to the edge device 112, the NSE programs the VPP to insert VNIDs and SGTs into the corresponding \ALAN headers for these microservice flows.

Generally, the cloud infrastructure 102 and IBN architecture 106 (as well as intermediary networks used to communicate) may each respectively include one or more networks implemented by any viable communication technology, such as wired and/or wireless modalities and/or technologies. The cloud infrastructure 102 and IBN architecture 106 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The cloud infrastructure 102 and IBN architecture 106 may include devices, virtual resources, or other nodes that relay packets from one network segment to another by nodes in the computer network.

Generally, the cloud administrators 124 and network administrators 126 may use devices that comprise any type of device configured to communicate using various communication protocols (e.g., VPN, SSL, TLS, DTLS, and/or any other protocol) over networks. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

FIGS. 2A-2E collectively illustrate a system-architecture diagram of an example environment in which a Cloud-Native architecture establishes an encrypted tunnel with an edge device associated with an IBN architecture, exchanges access policies using the encrypted tunnel with the IBN architecture, and the access policies are then de-conflicted and enforced as consistent policies.

Figure 2A:
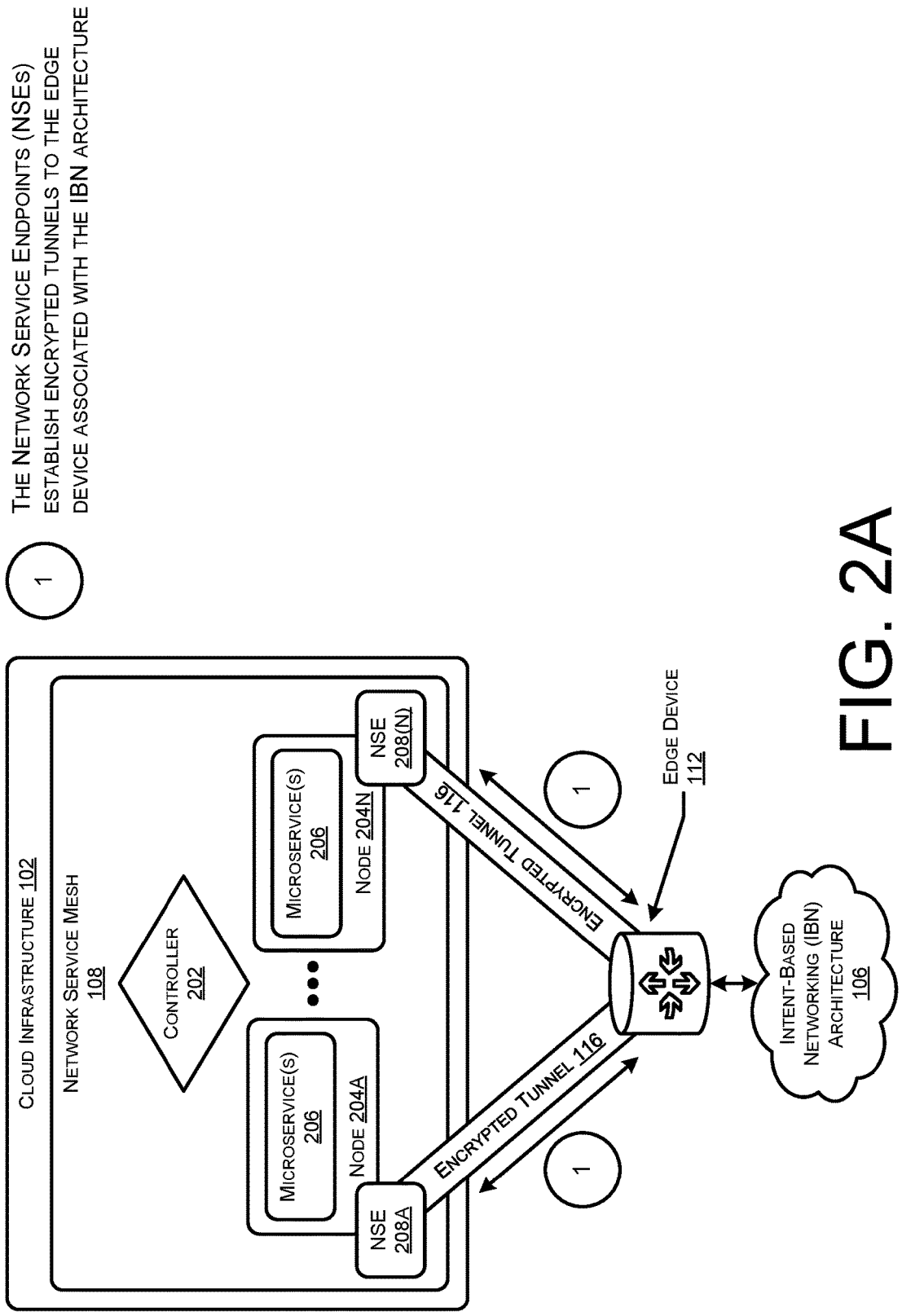
FIGS. 2A-2E collectively illustrate a system-architecture diagram of an example environment in which a Cloud-Native architecture establishes an encrypted tunnel with an edge device associated with an IBN architecture, exchanges access policies using the encrypted tunnel with the IBN architecture, and the access policies are then de-conflicted and enforced as consistent policies.

In FIG. 2A, at "1" the network service endpoints (NSEs) establish encrypted tunnels to the edge device 112 that is associated with the IBN architecture 106. The encrypted tunnel 116 may be any type of encrypted tunnel, such as VXLAN, NVGRE, OTV, Internet, IPsec, and so forth. In a specific example, each NSE may establish a respective VLXLAN tunnel to an SD-WAN router (e.g., edge device 112) hosted in the same cloud infrastructure 102 managed by a cloud provider (these can be IPSec-only; but optionally VXLAN may encapsulate IPSec, to ensure confidentiality). The VXLAN header may include fields for a Virtual Network Identifier (VNID) and a Scalable Group Tag (SGT). Using this encapsulation method, along with these logical identifiers, preserves and enforces the logical separation of traffic all the way to/from the container cluster. To note, the method to achieve VXLAN encapsulation is that the NSE programs the Vector Packet Processing (VPP) fast network data plane in the Kubernetes cluster to perform the VXLAN encapsulation.

Figure 2B:
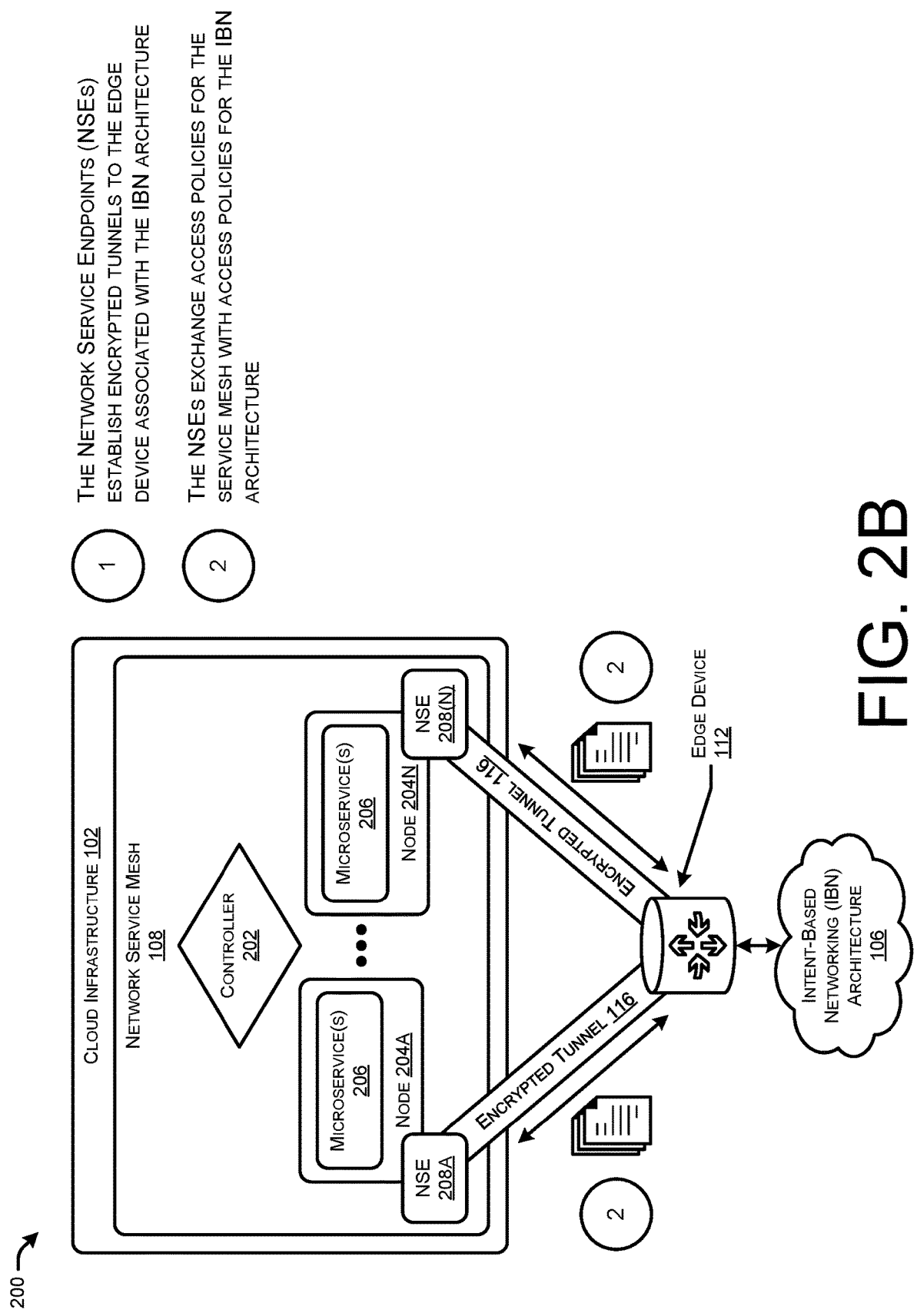

In FIG. 2B, at "2" the NSEs 208 exchange access policies for the service mesh 108 with access policies for the IBN architecture 106. That is, after creating the encrypted tunnels 116, the NSEs may exchange mesh access policies 118 deployed over the network service mesh 108 with the edge device 112 for IBN access policies 120 associated with the IBN architecture (e.g., SD-WAN access policies). For instance, one or more of the NSEs may send mesh access policies 118 to the edge deice(s) 112, and one or more edge device(s) 112 may send IBN access policies 120 to the NSE(s) via encrypted tunnel(s) 116.

Figure 2C:
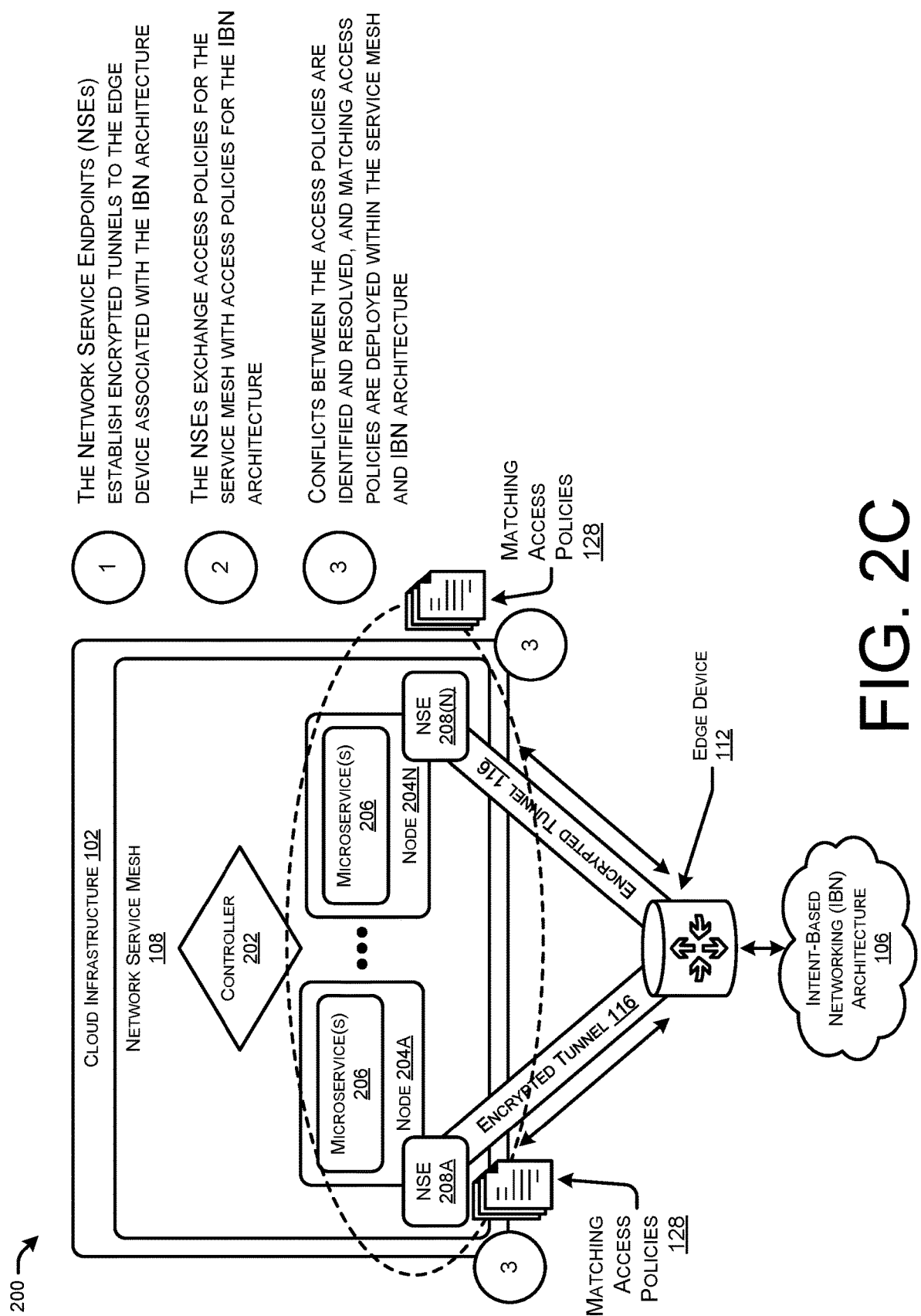

In FIG. 2C, at "3" the IBN architecture 106 and the Cloud-Native architecture 102 may identify and resolve conflicts between the access policies, and matching access policies may be deployed within the service mesh 108 and IBN architecture 106. For instance, after exchanging policies, a device or system (e.g., orchestrator, controller, etc.) in the cloud infrastructure 102 and a device or system (e.g., orchestrator, controller, etc.) in the IBN architecture 106 may each compare or analyze the access policies 118 and 120 to identify conflicts or differences between the sets of access policies 118/120. Generally, a conflict is any access rule or policy that results in communications being treated differently in the cloud infrastructure 102 and IBN architecture, and/or an absence of an access rule or policy from one of the access policies 118/120. For instance, the mesh access policy 118 may permit particular applications or microservices 110 to communicate in the network service mesh 108, whereas the IBN access policy 120 may deny the same applications or microservices 110 from communicating in the IBN architecture 106. As another example, the IBN access policy 120 may indicate that particular applications or microservices 110 are either allowed or denied from communicating, and the mesh access policies 118 may be silent regarding and access policy for those same applications or microservices 110. In some instances, prior to comparing the mesh access policies 118 and IBN access policies, the two sets of access policies 118/120 may be converted or expressed in the same format or semantics.

After identifying the conflicts in the sets of access policies 118/120, the conflicts may be resolved using various techniques. In some examples, the conflicts may be reported to the cloud administrator(s) 124 and the network administrator(s) 126 that provide input to resolve the conflicts. For instance, the cloud administrator(s) 124 and the network administrator(s) 126 may be alerted to the conflicts, and may provide a resolution to the conflicts that bring the sets of access policies 18/120 into alignment of intent.

In another example, devices or systems in the cloud infrastructure 102 and IBN architecture 106 (e.g., orchestrators, controllers, etc.) may automatically resolve the conflicts according to different rules or heuristics. For example, the devices or systems may simply select the access policy defined in one of the cloud infrastructure 102 or IBN architecture 106 as always "winning" or being selected when a conflict arises. As another example, the cloud infrastructure 102 or IBN architecture 106 may be selected based on the type of access rule or policy. However, various types of rules may be used when de-conflicting the conflicts between the mesh access policies 118 and the IBN access policies 120.

Figure 2D:
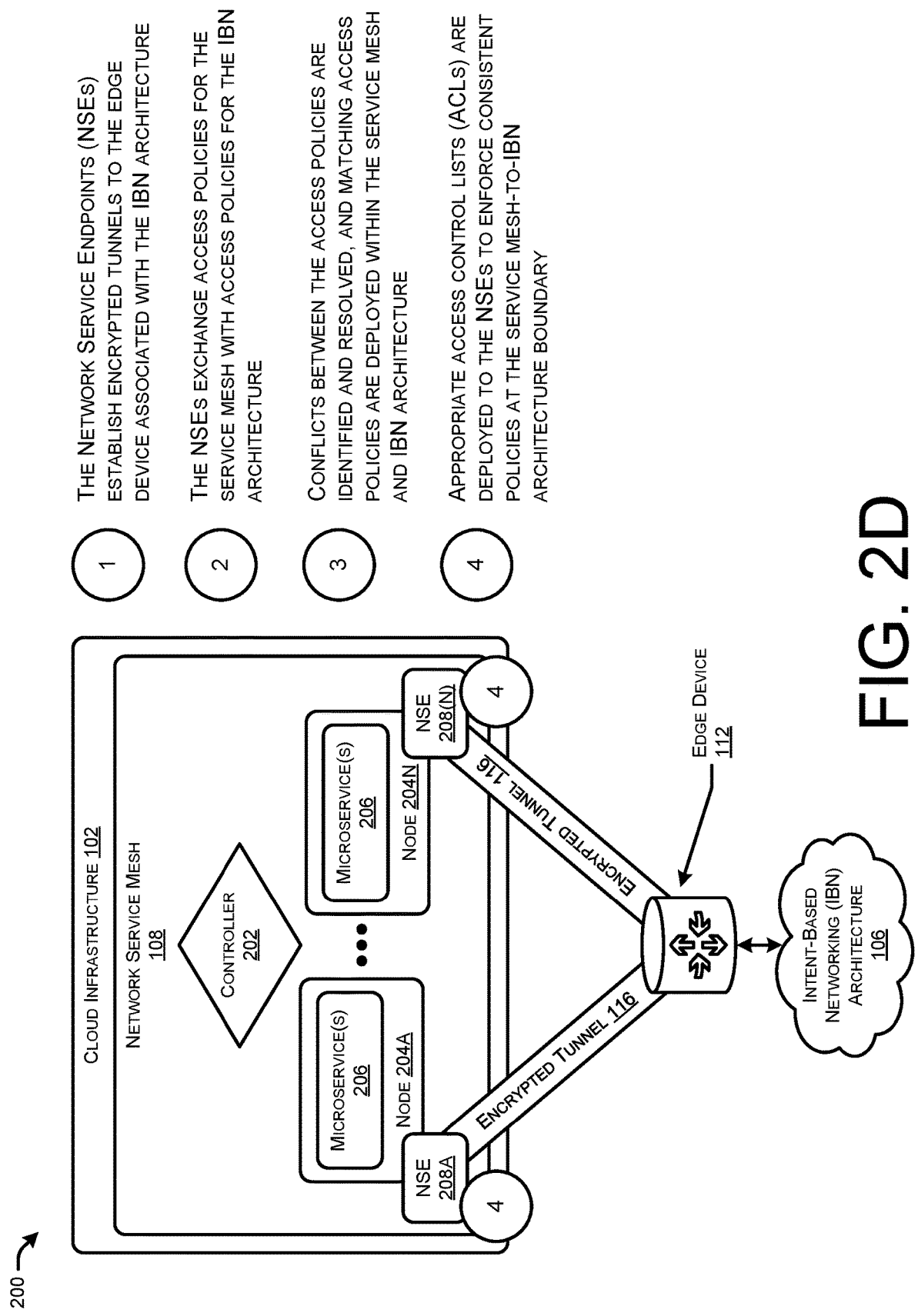

In FIG. 2D, once the conflicts 122 are resolved, matching access policies 128 with resolution(s) 130 are used and appropriate access control lists (ACLs) are deployed to the NSEs 208 to enforce consistent policies at the service mesh-to-IBN architecture boundary.

Figure 2E:
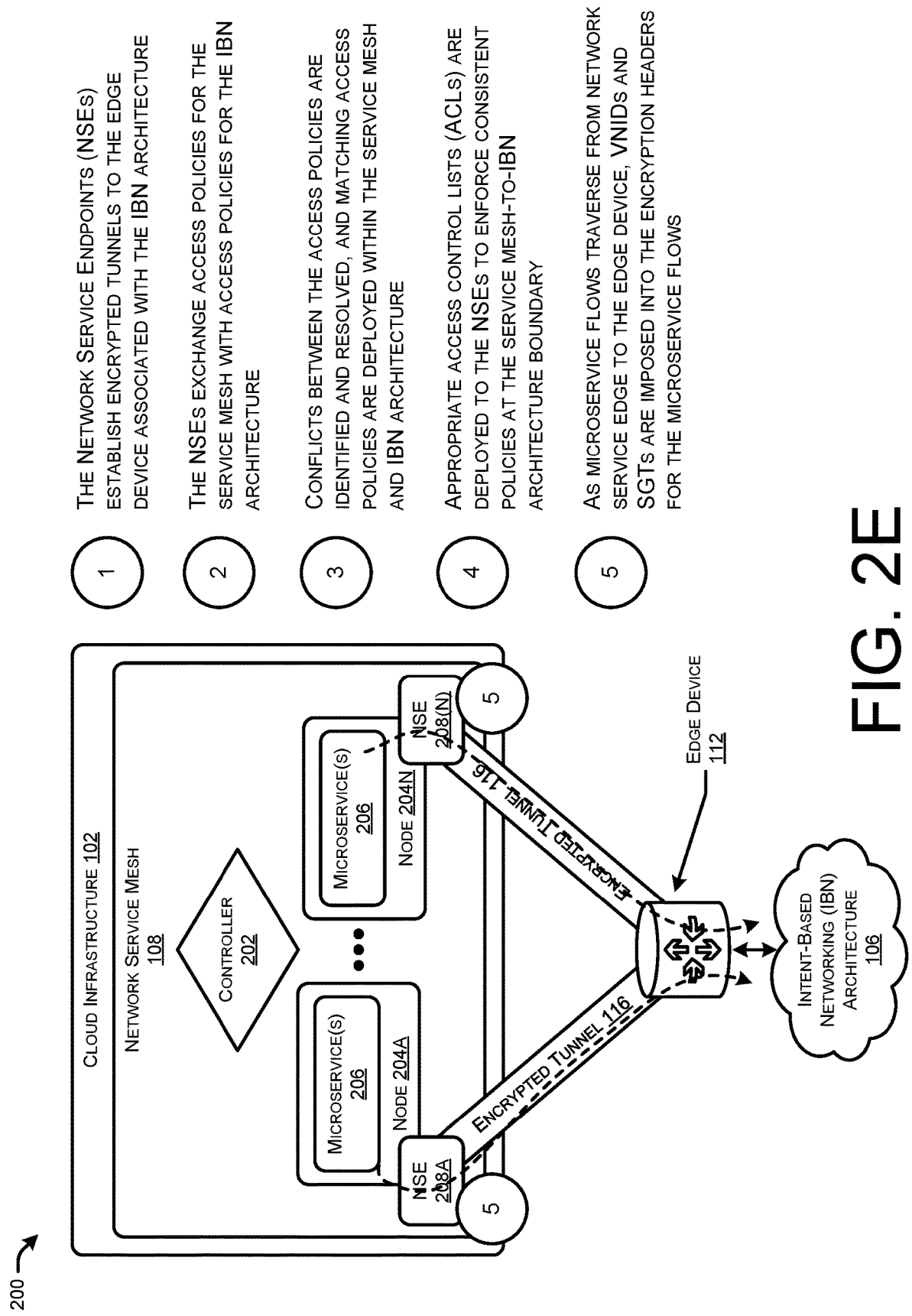

As shown in FIG. 2E, as microservice flows traverse from the network service edge to the edge device 112, VNIDs and SGTs are imposed into the encryption headers for the microservice flows. Appropriate SG-ACLS are dynamically deployed to the NSEs to enforce consistent policies at the cluster-to-IBN boundary in the cluster of the Cloud-Native infrastructure 102, and application-to-application access policies are expressed via tags (e.g., Portshift tags) and enforced via the service mesh 108. The matching access policies 128 are then applied to traffic. For instance, as microservice communications traverse from the NSEs to the edge device 112, the NSE programs the VPP to insert VNIDs and SGTs into the corresponding VXLAN headers for these microservice flows.

Figure 3:
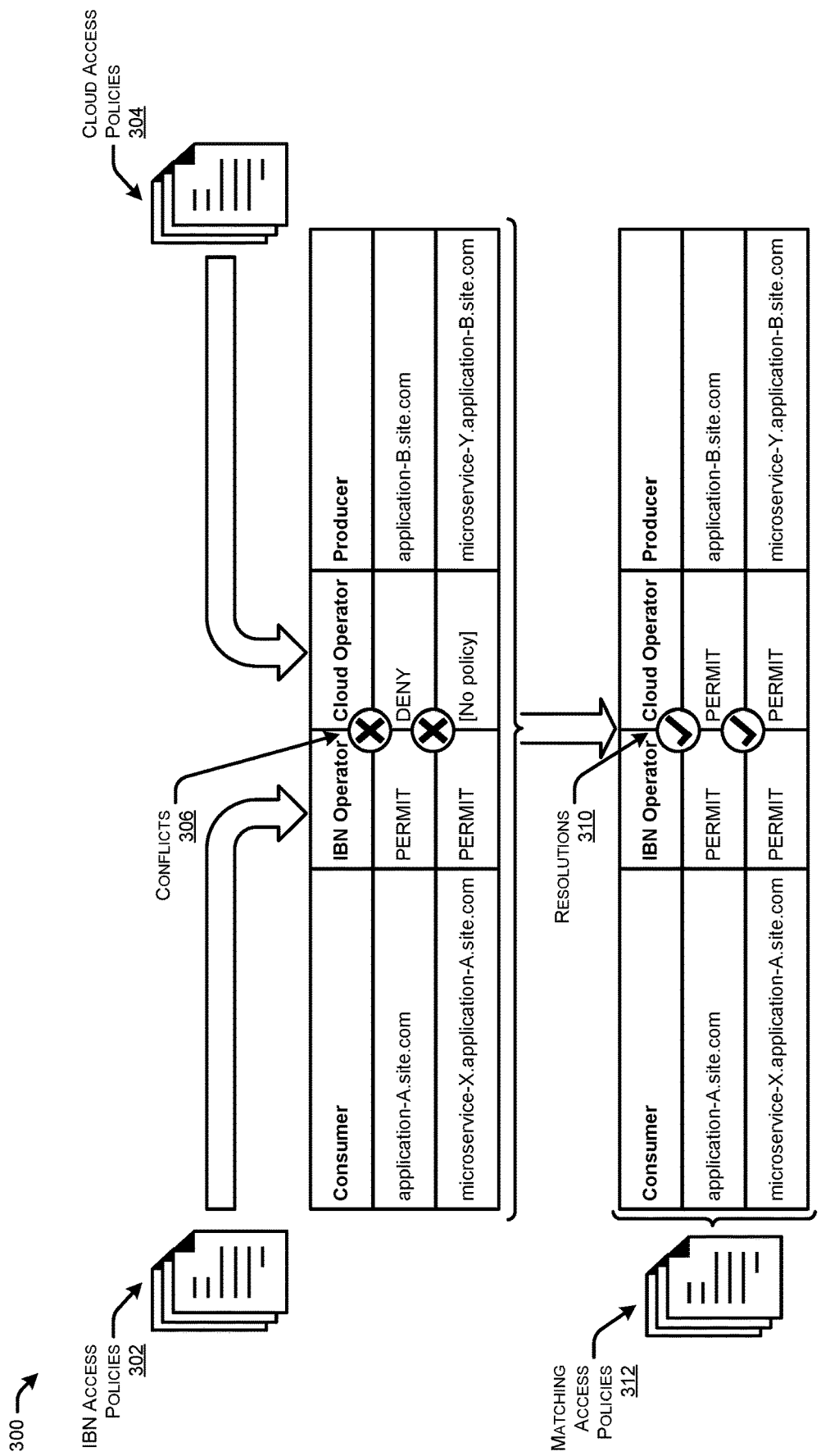
FIG. 3 illustrates a diagram of an example where IBN and cloud access policies conflict, and the conflicts are resolved to result in matching, or consistent, access policies to be enforced across the architectures.

FIG. 3 illustrates a diagram 300 of an example where IBN and cloud access policies conflict, and the conflicts are resolved to result in matching, or consistent, access policies to be enforced across the architectures.

As illustrated, the IBN access policies 302 define that application-A is permitted to communicate with or access application-B in the IBN architecture 106 and microservice-X is permitted to communicate with or access microservice-y. however, the cloud access policies 304 indicate that the application-A is denied from communicating with or accessing application-B and that microservice-X does not have a policy for accessing or communicating with microservice-y. Thus, multiple conflicts 306 exist between the sets of access policies 302/304 (and more conflicts 306 may exist, though not shown).

As shown in FIG. 3, resolutions 310 may be applied to remedy or de-conflict the conflicts 306 to result in matching access policies 312. In this illustrative example, the access policies of the IBN architecture 106 may be adopted to resolve the conflicts 306. However, in some instances the access policies of the clout infrastructure 102 may be implemented to remedy conflicts, and/or other rules or heuristics may be applied to determine the resolutions 310 for the conflicts 306.

Figure 5:
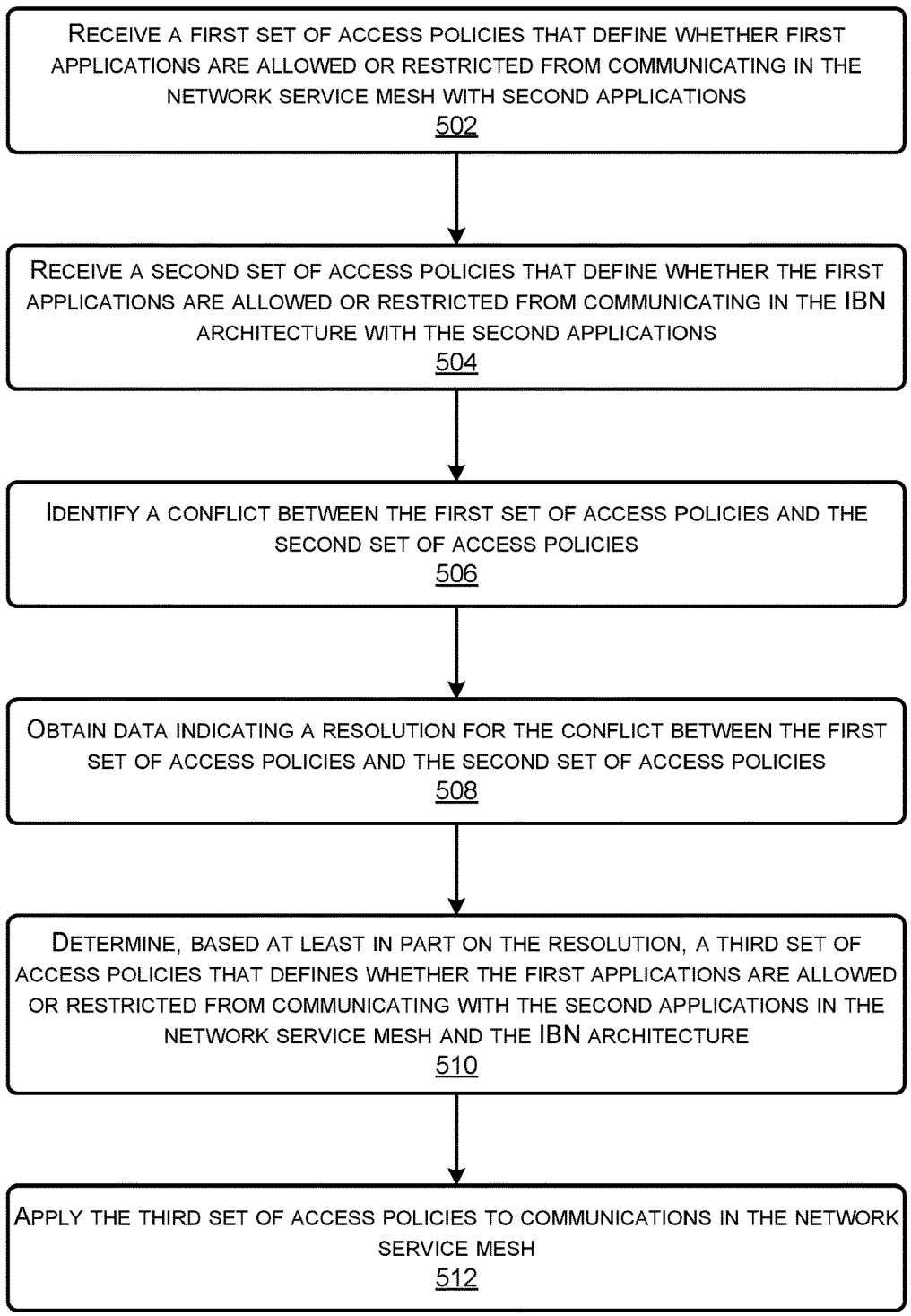
FIG. 5 illustrates a flow diagram of an example method for a Cloud-Native architecture to receive access policies for an IBN architecture, de-conflict the access policies of the IBN architecture with access policies of the Cloud-Native architecture, and enforce consistent access policies across each architecture.

FIGS. 4 and 5 illustrate flow diagrams of example methods that illustrate various aspects of the techniques of this disclosure. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for obtaining access policies for an IBN architecture and a Cloud-Native architecture, de-conflicting the access policies, and enforce consistent access policies across each architecture.

At 402, at least one of a cloud-native application or an IBN architecture 106 may obtain a first set of access policies for the network service mesh 108. Generally, the first set of access policies defines whether first applications 110 are allowed or restricted from communicating in the network service mesh 108 with second applications 110, or first microservices 110 are allowed or restricted from communicating with second microservices 110 (e.g., mesh access policies 118).

At 404, at least one of the cloud-native application or the IBN architecture 106 may obtain a second set of access policies for an intent-based network (IBN) architecture. Generally, the second set of access policies defines whether first applications 110 are allowed or restricted from communicating in the IBN architecture 106 with second applications 110, or first microservices 110 are allowed or restricted from communicating with second microservices 110 (e.g., IBN access policies 120).

At 406, at least one of the cloud-native application or the IBN architecture 106 may identify a conflict between the first set of access policies and the second set of access policies, and determine a resolution for the conflict between the first set of access policies and the second set of access policies. In some instances, determining the resolution for the conflict includes receiving input indicating the resolution from at least one of a network administrator associated with the network service mesh or from a network administrator associated with the IBN architecture.

At 408, at least one of the cloud-native application or the IBN architecture 106 may determine, based at least in part on the resolution, a third set of access policies that defines whether the first applications are allowed or restricted from communicating with the second applications in the network service mesh and the IBN architecture. For instance, the third set of access policies may be matching access policies 128 that are consistently applied policies across the network service mesh 108 and the IBN architecture 106.

FIG. 5 illustrates a flow diagram of an example method 500 for a Cloud-Native architecture to receive access policies for an IBN architecture, de-conflict the access policies of the IBN architecture with access policies of the Cloud-Native architecture, and enforce consistent access policies across each architecture.

At 502, a network service mesh 108 may receive a first set of access policies that define whether first applications are allowed or restricted from communicating in the network service mesh with second applications. For instance, a cloud administrator 124 may define the mesh access policies 118 associated with the network service mesh 108.

At 504, the network service mesh 108 may receive, from an IBN architecture 106, a second set of access policies that define whether the first applications are allowed or restricted from communicating in the IBN architecture with the second applications. For example, the edge device 112 may provide the IBN access policies 120 to the network service mesh 108 (e.g., NSEs).

At 506, the network service mesh 108 may identify a conflict between the first set of access policies and the second set of access policies. In some instances, the network service mesh 108 may convert one or both of the access policies 118/120 into a common format and compare entries or lists to identify conflicts between access permissions or denials in the access policies 118/120.

At 508, the network service mesh 108 may obtain data indicating a resolution for the conflict between the first set of access policies and the second set of access policies. In some instances, the network service mesh 108 may receive input data from a cloud administrator 124 indicating the conflict 122, and in some instances, an automated component (e.g., orchestrator, controller, management system, etc.) may parse and automate discovery of the conflict 122.

At 510, the network service mesh 108 may determine, based at least in part on the resolution, a third set of access policies that defines whether the first applications are allowed or restricted from communicating with the second applications in the network service mesh and the IBN architecture. For instance, the network service mesh 108 may use a resolution 130 to determine a matching set of access policies 128. At 512, the network service mesh 108 may apply the third set of access policies to communications in the network service mesh.

Figure 6:
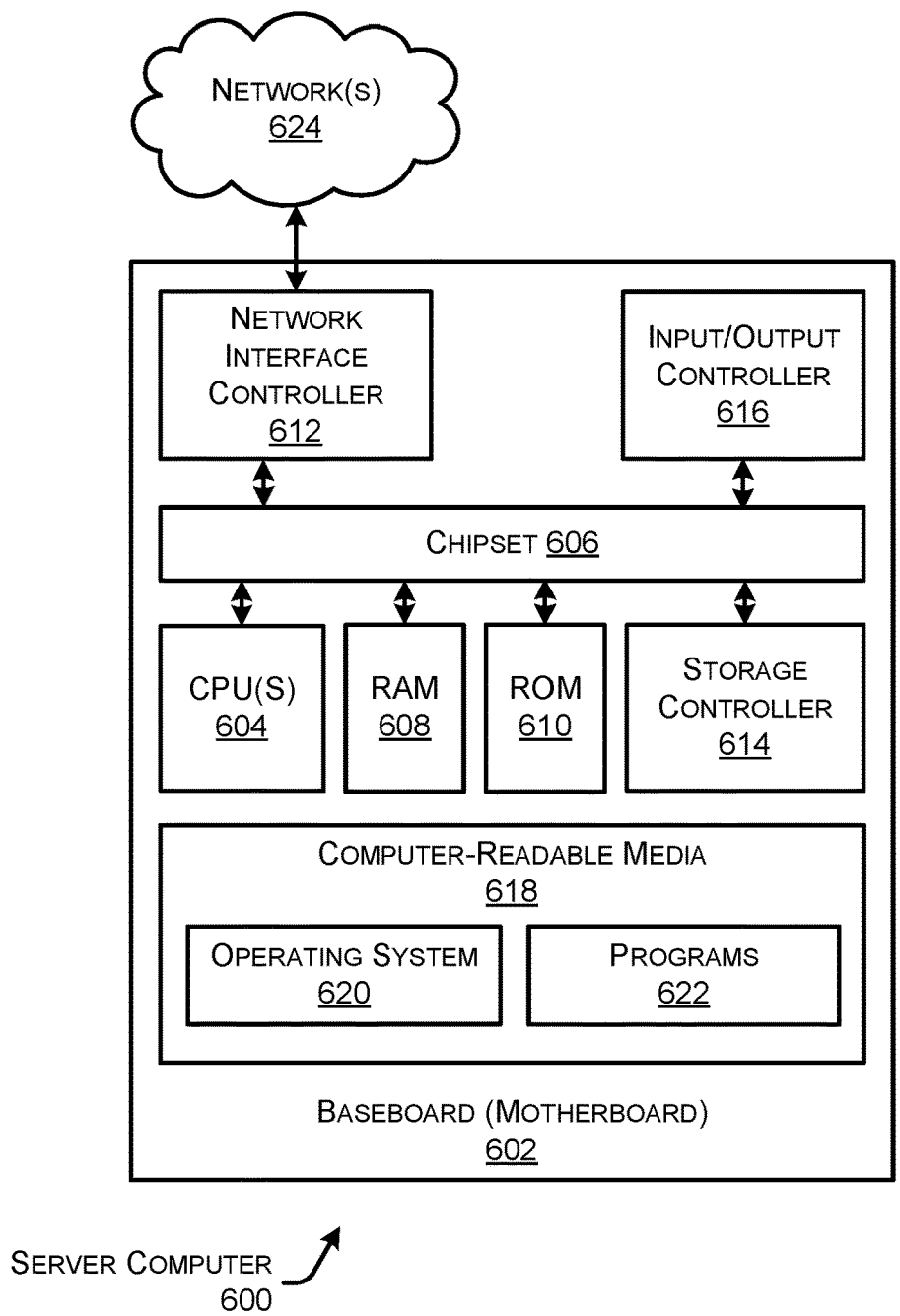
FIG. 6 illustrates a computer architecture diagram showing an example computer hardware architecture for implementing a computing device that can be utilized to implement aspects of the various technologies presented herein.

FIG. 6 illustrates a computer architecture diagram showing an example computer hardware architecture 600 for implementing a computing device that can be utilized to implement aspects of the various technologies presented herein. The computer hardware architecture 600 shown in FIG. 6 illustrates a conventional server computer, a controller 202 device, network device, workstation, desktop computer, laptop, tablet, network appliance, e-reader, smartphone, or other computing device, and can be utilized to execute any of the software components presented herein. The computer 600 may, in some examples, correspond to any device or system of devices described herein, and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 624. The chipset 606 can include functionality for providing network connectivity through a Network Interface Controller (NIC) 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems. In some examples, the NIC 612 may be configured to perform at least some of the techniques described herein, such as packet redirects and/or other techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 624 and or any components included therein, may be supported by one or more devices similar to computer 600. Stated otherwise, some or all of the operations performed by the network 624, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a device, controller, system of devices, or a network device (e.g., server computer, computing resource, router, etc.). The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the client devices 106 and computing resources The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. The programs 622 may enable the computing resources server computer 600 (and/or any other computer) to perform any of the operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing instructions that, when executed by the one or more processors, cause the one or more processors to perform operations comprising:
receiving, at a containerized-application network, a first set of access policies that define whether first applications are allowed or restricted from communicating in the containerized-application network with second applications;
receiving, at the containerized-application network and from a network architecture, a second set of access policies that define whether the first applications are allowed or restricted from communicating in the network architecture with the second applications;
identifying a conflict between the first set of access policies and the second set of access policies;
obtaining data indicating a resolution for the conflict between the first set of access policies and the second set of access policies;
determining, based at least in part on the resolution, a third set of access policies that defines whether the first applications are allowed or restricted from communicating with the second applications in the containerized-application network and the network architecture; and
applying the third set of access policies to communications in the containerized-application network.

2. The system of claim 1, further comprising:
a network service endpoint (NSE) associated with the containerized-application network; and
a network device associated with the network architecture,
the operations further comprising:
establishing an encrypted tunnel between the NSE and a network device associated with the network architecture,
wherein obtaining the second set of access policies includes receiving, at the NSE, the second set of access policies from the network device and over the encrypted tunnel.

3. The system of claim 1, wherein:
obtaining the first set of access policies and obtaining the second set of access policies are performed at the containerized-application network; and
determining the resolution for the conflict includes receiving input from a network administrator associated with the containerized-application network, the input indicating the resolution.

4. The system of claim 1, wherein:
obtaining the first set of access policies and obtaining the second set of access policies are performed at the network architecture; and
determining the resolution for the conflict includes receiving input from a network administrator associated with the network architecture, the input indicating the resolution.

5. The system of claim 1, further comprising:
identifying a conflict rule indicating that conflicts between the second set of access policies of the containerized-application network and the first set of access policies of the network architecture are resolved by adopting the second set of access policies of the containerized-application network,
wherein the determining the resolution for the conflict includes selecting a first access policy of the first set of access policies over a second access policy of the second set of access policies that conflicts with the first access policy.

6. The system of claim 1, further comprising:
identifying a conflict rule indicating that conflicts between access policies of the containerized-application network and access policies of the network architecture are resolved by adopting the access policies of the network architecture,
wherein the determining the resolution for the conflict includes selecting a second access policy of the second set of access policies over a first access policy of the first set of access policies that conflicts with the second access policy.

7. The system of claim 1, further comprising:
detecting a change in at least one of the first set of access policies or the second set of access policies; and
determining whether the change resulted in a subsequent conflict between the first set of access policies and the second set of access policies.

8. A computer-implemented method comprising:
receiving, at a containerized-application network, a first set of access policies that define whether first applications are allowed or restricted from communicating in the containerized-application network with second applications;

receiving, at the containerized-application network and from a network architecture, a second set of access policies that define whether the first applications are allowed or restricted from communicating in the network architecture with the second applications;

identifying a conflict between the first set of access policies and the second set of access policies;

obtaining data indicating a resolution for the conflict between the first set of access policies and the second set of access policies;

determining, based at least in part on the resolution, a third set of access policies that defines whether the first applications are allowed or restricted from communicating with the second applications in the containerized-application network and the network architecture; and applying the third set of access policies to communications in the containerized-application network.

9. The computer-implemented method of claim 8, further comprising:

establishing, by a network service endpoint (NSE) of the containerized-application network, an encrypted tunnel with a network device associated with the network architecture; and sending the first set of access policies to the network device using the encrypted tunnel.

10. The computer-implemented method of claim 8, further comprising:

detecting a change in the first set of access policies; and determining whether the change in the first set of access policies caused another conflict between the first set of access policies and the second set of access policies.

11. The computer-implemented method of claim 8, further comprising:

converting at least one of the first set of access policies or the second set of access policies such the first set of access policies and the second set of access policies are in a common format, wherein identifying the conflict is performed by comparing the first set of access policies and the second set of access policies once in the common format.

12. The computer-implemented method of claim 8, wherein obtaining the data indicating the resolution includes receiving input that indicates the resolution from a network administrator associated with the containerized-application network.

13. The computer-implemented method of claim 8, further comprising:

identifying a conflict rule indicating that conflicts between the second set of access policies of the containerized-application network and the first set of access policies of the network architecture are resolved by adopting the second set of access policies of the containerized-application network, wherein the obtaining the data indicating the resolution for the conflict includes selecting a first access policy of the first set of access policies over a second access policy of the second set of access policies that conflicts with the first access policy.

14. The computer-implemented method of claim 8, further comprising:

identifying a conflict rule indicating that conflicts between access policies of the containerized-application network and access policies of the network architecture are resolved by adopting the access policies of the network architecture, wherein the obtaining the data indicating the resolution for the conflict selecting a second access policy of the second set of access policies.

15. A computer-implemented method comprising:

receiving, at a network architecture, a first set of access policies that define whether first applications are allowed or restricted from communicating in the network architecture with second applications;

receiving, at the network architecture and from a containerized-application network, a second set of access policies that define whether the first applications are allowed or restricted from communicating in the containerized-application network with the second applications;

identifying a conflict between the first set of access policies and the second set of access policies;

obtaining data indicating a resolution for the conflict between the first set of access policies and the second set of access policies;

determining, based at least in part on the resolution, a third set of access policies that defines whether the first applications are allowed or restricted from communicating with the second applications in the containerized-application network and the network architecture; and applying the third set of access policies to communications in the network architecture.

16. The computer-implemented method of claim 15, further comprising:

establishing an encrypted tunnel between a network device of the network architecture and a network service endpoint (NSE) of the containerized-application network; and sending the first set of access policies to the NSE using the encrypted tunnel.

17. The computer-implemented method of claim 15, further comprising:

detecting a change in the first set of access policies; and determining whether the change in the first set of access policies caused another conflict between the first set of access policies and the second set of access policies.

18. The computer-implemented method of claim 15, further comprising:

converting at least one of the first set of access policies or the second set of access policies such the first set of access policies and the second set of access policies are in a common format, wherein identifying the conflict is performed by comparing the first set of access policies and the second set of access policies once in the common format.

19. The computer-implemented method of claim 15, wherein obtaining the data indicating the resolution includes receiving input that indicates the resolution from a network administrator associated with the containerized-application network.

20. The computer-implemented method of claim 15, further comprising:

identifying a conflict rule indicating that conflicts between the second set of access policies of the containerized-application network and the first set of access policies of the network architecture are resolved by adopting the second set of access policies of the containerized-application network, wherein the obtaining the data indicating the resolution for the conflict includes selecting a first access policy of the first set of access policies over a second access policy of the second set of access policies that conflicts with the first access policy.

\* \* \* \* \*